(12) United States Patent
Taglang

(10) Patent No.: US 6,499,746 B2
(45) Date of Patent: Dec. 31, 2002

(54) LEVER-ACTION CHUCK

(75) Inventor: Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 27 days.

(21) Appl. No.: 09/782,741

(22) Filed: Feb. 13, 2001

(65) Prior Publication Data

US 2001/0015531 A1 Aug. 23, 2001

(30) Foreign Application Priority Data

Feb. 19, 2000 (DE) .......................................... 200 03 067

(51) Int. Cl.⁷ .............................................. B23B 31/12
(52) U.S. Cl. ...................................... 279/106; 279/123
(58) Field of Search ................................ 279/106, 107, 279/108, 109, 123; 294/106, 115, 116

(56) References Cited

U.S. PATENT DOCUMENTS

| | | | | |
|---|---|---|---|---|
| 4,684,309 A | * | 8/1987 | Horn et al. ................ | 294/116 |
| 5,970,829 A | * | 10/1999 | Conley ........................ | 279/106 |
| 6,073,940 A | * | 6/2000 | Tabachenko et al. ........ | 279/123 |
| 6,375,197 B1 | * | 4/2002 | Barbieux ..................... | 279/106 |

* cited by examiner

Primary Examiner—Steven Wong
(74) Attorney, Agent, or Firm—Herbert Dubno; Andrew Wilford

(57) ABSTRACT

A chuck has a chuck body adapted to be rotated about a chuck axis and formed with a plurality of axially forwardly open passages each having a pair of angularly confronting side faces, respective guides pivotal in the passages about respective guide axes extending secantally of the chuck axis, and respective elongated jaw arms axially slidable in the guides. Each jaw arm has a pair of oppositely angularly directed side faces angularly confronting and spaced from the respective passage side faces. Two guide plate in each of the passages each have an outer face engaging one of the respective passage side faces and an inner face engaging the respective arm side face. These plates are releasably fixed in the chuck body.

4 Claims, 4 Drawing Sheets

LEVER-ACTION CHUCK

FIELD OF THE INVENTION

The present invention relates to a chuck. More particularly this invention concerns a lever-action chuck of the type used to hold the ends of a crankshaft as same is being machined.

BACKGROUND OF THE INVENTION

A standard lever-action chuck for use in a lathe or the like has a body adapted to be rotated about a chuck axis and formed with a plurality of axially forwardly open passages each having a pair of angularly confronting side faces. Respective guides in the passages are pivotal in the body about respective guide axes extending secantally of the axis, that is about axes that are offset from the chuck axis and that each lie in a plane generally perpendicular to the chuck axis. Respective elongated jaw arms axially slidable in the guides each have a pair of angularly oppositely directed side faces riding on the respective passage side faces. Means is provided to axially displace the jaw arms between outer positions with their outer ends spaced forward from an end face of the chuck body and inner positions with their outer ends closed to or even recessed in the end face of the chuck body. Further means is provided for pivoting the jaw arms about the respective secantal guide axes so that, in the outer position, the outer arm ends can pivot in to grip a workpiece.

Such chucks are typically used in axially confronting pairs to rotate a workpiece such as a crank shaft that is gripped at both ends and rotated about the coaxial chuck axes to machine bearing and crank surfaces of the crankshaft. The retractability of the jaw arms makes it possible to load the workpiece into the chucks and remove it from them radially of the machining axis without having to axially displace the chucks. The pivotability of the jaw arms makes it possible to clasp them on the workpiece without applying an axial force to the workpiece, which force could distort it.

The main problem with this type of chuck is in accurately fitting the jaw arms to the chuck body. They are normally of square or rectangular section and are supported on their radially inner and outer surfaces in the guides and on their angularly oppositely directed side faces directly on the side walls or faces of the passages. Thus these passages must be meticulously machined in the chuck body. Any error during the machining results in a ruined workpiece. Furthermore once the chuck wears somewhat, it must normally be discarded as loose jaw arms cannot hold the workpiece perfectly on center as required in a precise machining operation.

OBJECTS OF THE INVENTION

It is therefore an object of the present invention to provide an improved lever-action chuck.

Another object is the provision of such an improved lever-action chuck which overcomes the above-given disadvantages, that is which is easier to manufacture and that has a longer service life than the known such lever-action chuck.

SUMMARY OF THE INVENTION

A chuck has according to the invention a chuck body adapted to be rotated about a chuck axis and formed with a plurality of axially forwardly open passages each having a pair of angularly confronting side faces, respective guides pivotal in the passages about respective guide axes extending secantally of the chuck axis, and respective elongated jaw arms axially slidable in the guides. Each jaw arm has a pair of oppositely angularly directed side faces angularly confronting and spaced from the respective passage side faces. A respective guide plate in each of the passages has an outer face engaging one of the respective passage side faces and an inner face engaging the respective arm side face. These plates are releasably fixed in the passages.

Thus with this system the critical side faces of the guide passages, which are subject to considerable stress during machining as the chuck is rotated at high speed, are made somewhat oversize. The guide places are subsequently fitted to them to achieve a perfect fit of the jaw arms, allowing any mismatches to be easily compensated for.

According to the invention a pair of the guide plates angularly flanks each of the jaw arms in each of the respective passages. Thus both side face of each jaw arm are accurately guided and supported on a respective such guide plate.

Furthermore each passage side face is formed with a seat in which the respective guide plate is fitted with the side face of each of the guide plates projecting angularly inward into the respective passage past the respective passage side face. Respective screws having heads bearing on the chuck body and shanks threaded into the guide plates fix the plates in the seats. The guide plates are rectangular and the faces are planar and extend parallel to the chuck axis.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
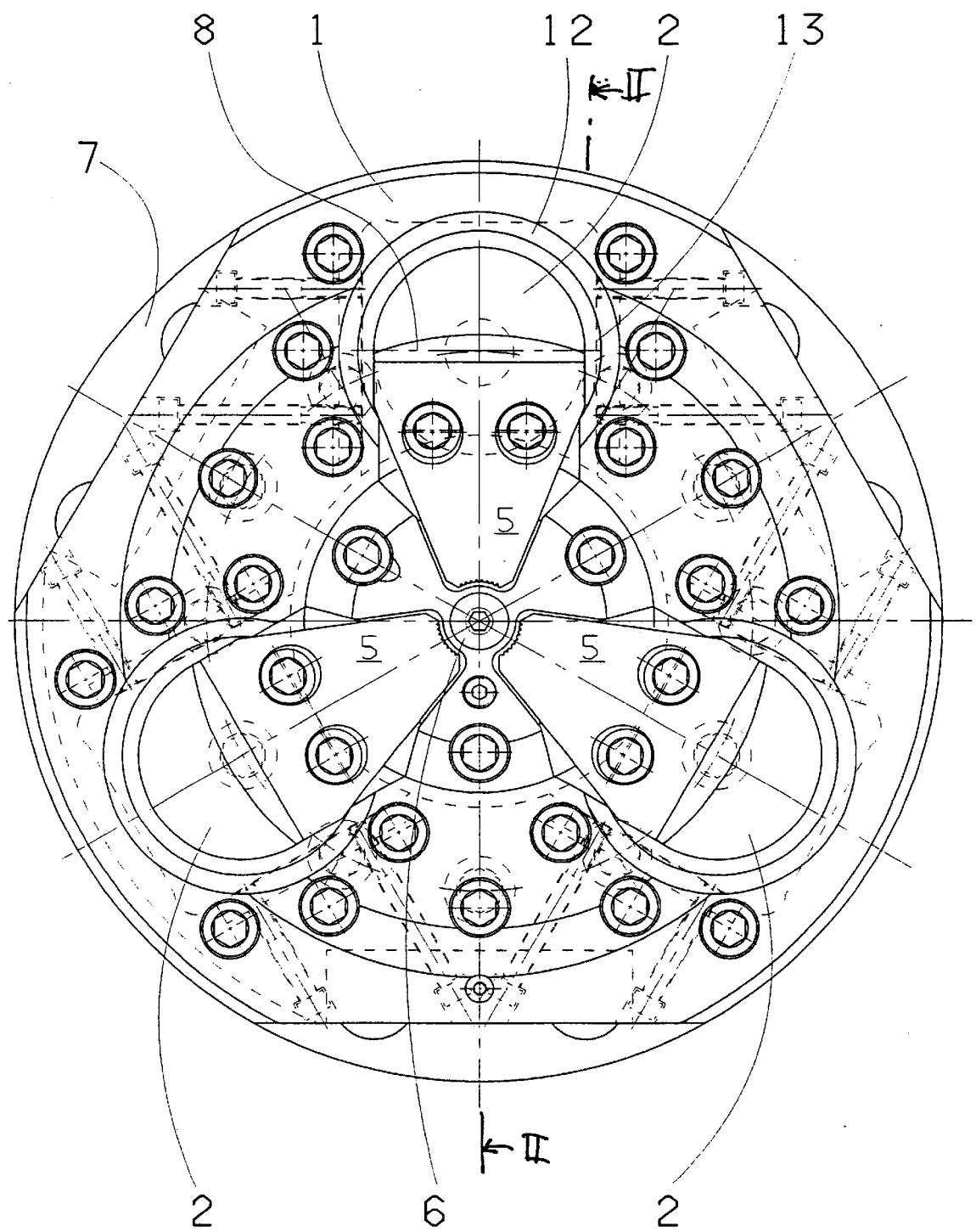
FIG. 1 is an end view of the chuck according to the invention.
Figure 2:
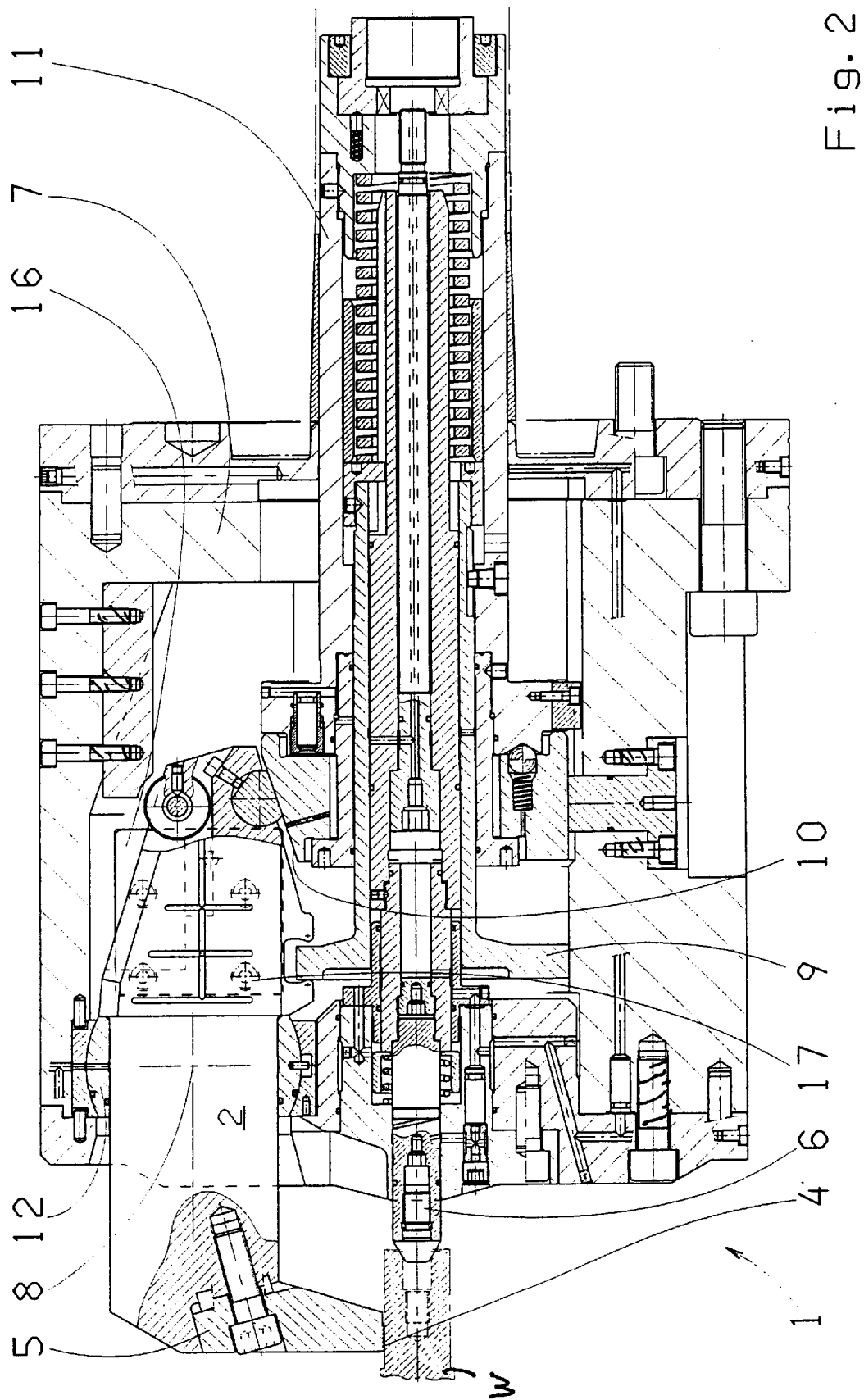
FIG. 2 is a section along line II—II of FIG. 1 with the jaw arms open and retracted.
Figure 3:
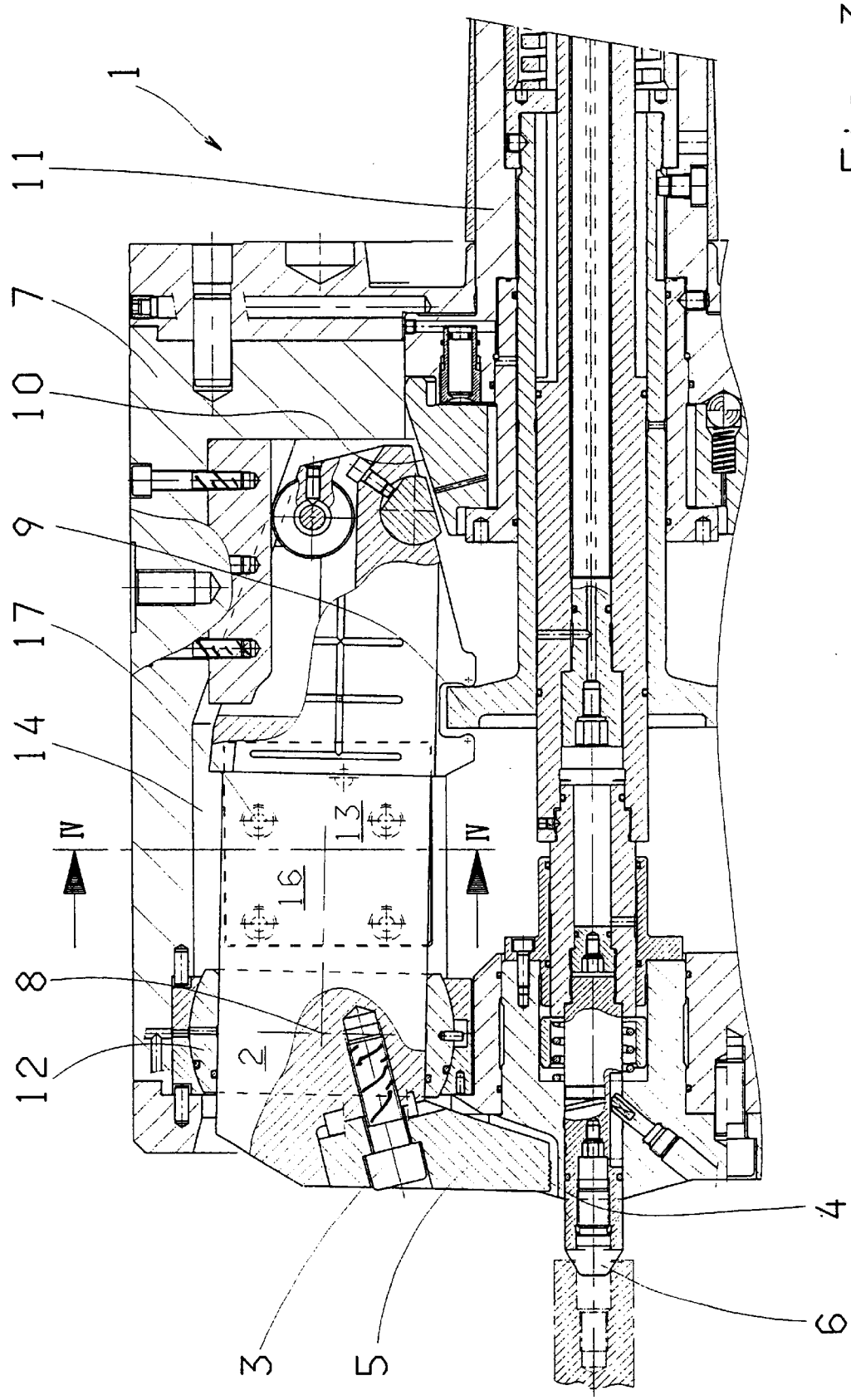
FIG. 3 is a view like a detail of FIG. 2 but with the jaw arms closed and advanced.
Figure 4:
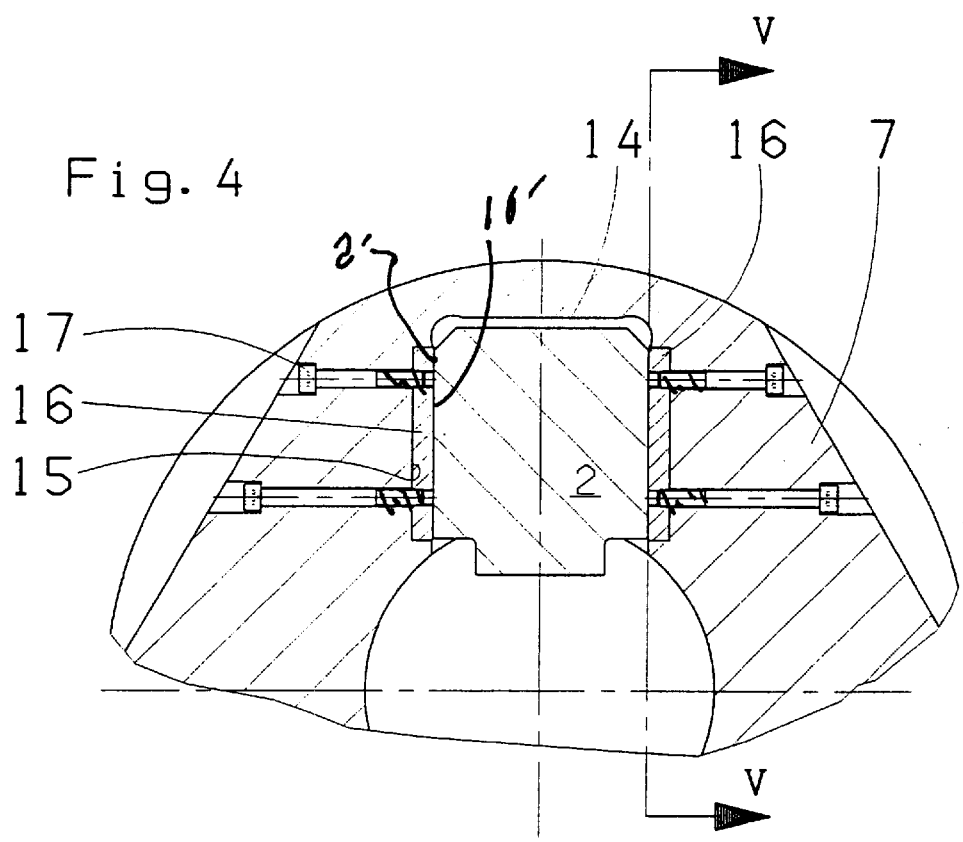
FIG. 4 is a section taken along line IV—IV of FIG. 3.
Figure 5:
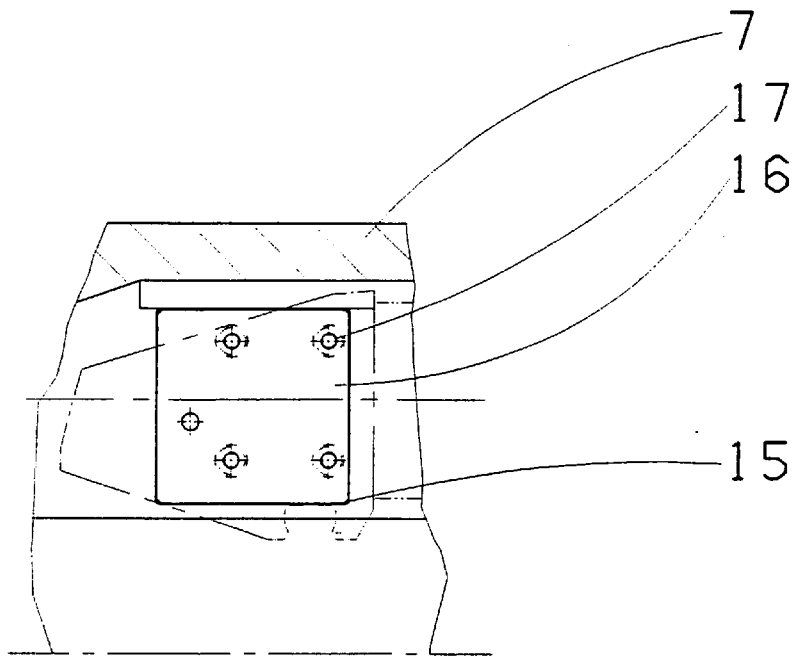
FIG. 5 is a section taken along line V—V of FIG. 4.

As seen in FIGS. 1 through 3 a chuck 1 according to the invention has a multipart steel body 7 centered on a normally horizontal axis A and formed with three angularly equispaced and axially extending passages 14 each receiving a respective jaw arm 2. The front or outer end of each arm 2 is fitted with a respective jaw 5 held in place by a respective pair of screws 3 and having a gripping face 4 adapted to engage a workpiece W held on a centering pin 6 as shown in FIG. 2. The jaw arms 2 slide axially at the front or outer ends of the passages 14 in ball guides 12 and are movable axially by an actuating element 9 between the extended or outer position of FIG. 2 and the retracted position of FIG. 3. The jaw arms 2 are also pivotal in their respective guides 12 about respective secantal axes 8 by a wedge collar 10 carried on a tube shaft 11 coaxial with the actuating element 9. This is all generally standard.

In accordance with the invention each passage 14 has a pair of angularly confronting side flanks 13 each in turn formed with a pocket or seat 15 receiving a respective guide or shim plate 16 having a face 16' on which rides a planar side face 2' of the respective jaw arm 2. The faces 2' and 16' extend in planes perpendicular to the respective secantal axes 8. Screws 17 extending parallel to the respective axes 8 extend from outside through the chuck body 7 into the plates 16 to secure them solidly in place in the respective seats 15.

Thus when the chuck 1 is manufactured the final fit of the jaw arms 2 in the passages 14, which is critical because the jaw arms 2 are primarily exposed to angular forces when in use, is determined by the plates 16. They can be manufactured in different thicknesses or machined easily apart from the chuck body 7 to have any desired thickness. Any variations in the chuck body 7 or jaw arm 2 can be compensated out, and it is even possible to refit the chuck 1 with new plates 16 when the old ones become worn and loose.

What is claimed is:

1. A chuck comprising:

a chuck body adapted to be rotated about a chuck axis and formed with a plurality of axially forwardly open passages each having a pair of angularly confronting side faces;

respective guides pivotal in the passages about respective guide axes and extending secantally of the chuck axis;

respective elongated jaw arms axially slidable in the guides and each having a pair of oppositely angularly directed side faces angularly confronting and spaced from the respective passage side faces;

a pair of guide plates in each of the passages flanking the respective jaw arms and each having an outer face engaging a respective one of the respective passage side faces and an inner face engaging the respective arm side face, each passage side face being formed with a seat in which the respective guide plate is fitted with the side face of each of the guide plates projecting angularly inward into the respective passage past the respective passage side face; and means for releasably fixing the guide plates in the chuck body.

2. The chuck defined in claim 1 wherein the fixing means includes respective screws having heads bearing on the chuck body and shanks threaded into the guide plates.

3. The chuck defined in claim 1 wherein the guide plates are rectangular.

4. The chuck defined in claim 1 wherein the faces are planar and extend parallel to the chuck axis.

\* \* \* \* \*